METHOD FOR HEAT TREATING RAILS

Original Filed Oct. 12, 1962 4 Sheets-Sheet 1

INVENTORS.
FERNAND J. DEWEZ, JR. and
JOSEPH M. WANDRISCO
By Donald G. Dalton
Attorney

METHOD FOR HEAT TREATING RAILS

Original Filed Oct. 12, 1962 4 Sheets-Sheet 2

INVENTORS.
FERNAND J. DEWEZ, JR. and
JOSEPH M. WANDRISCO
By Donald G. Dalton
Attorney

METHOD FOR HEAT TREATING RAILS

Original Filed Oct. 12, 1962 4 Sheets-Sheet 3

INVENTORS.
FERNAND J. DEWEZ, JR. and
JOSEPH M. WANDRISCO
By Donald G. Dalton
Attorney METHOD FOR HEAT TREATING RAILS
Original Filed Oct. 12, 1962 4 Sheets-Sheet 4
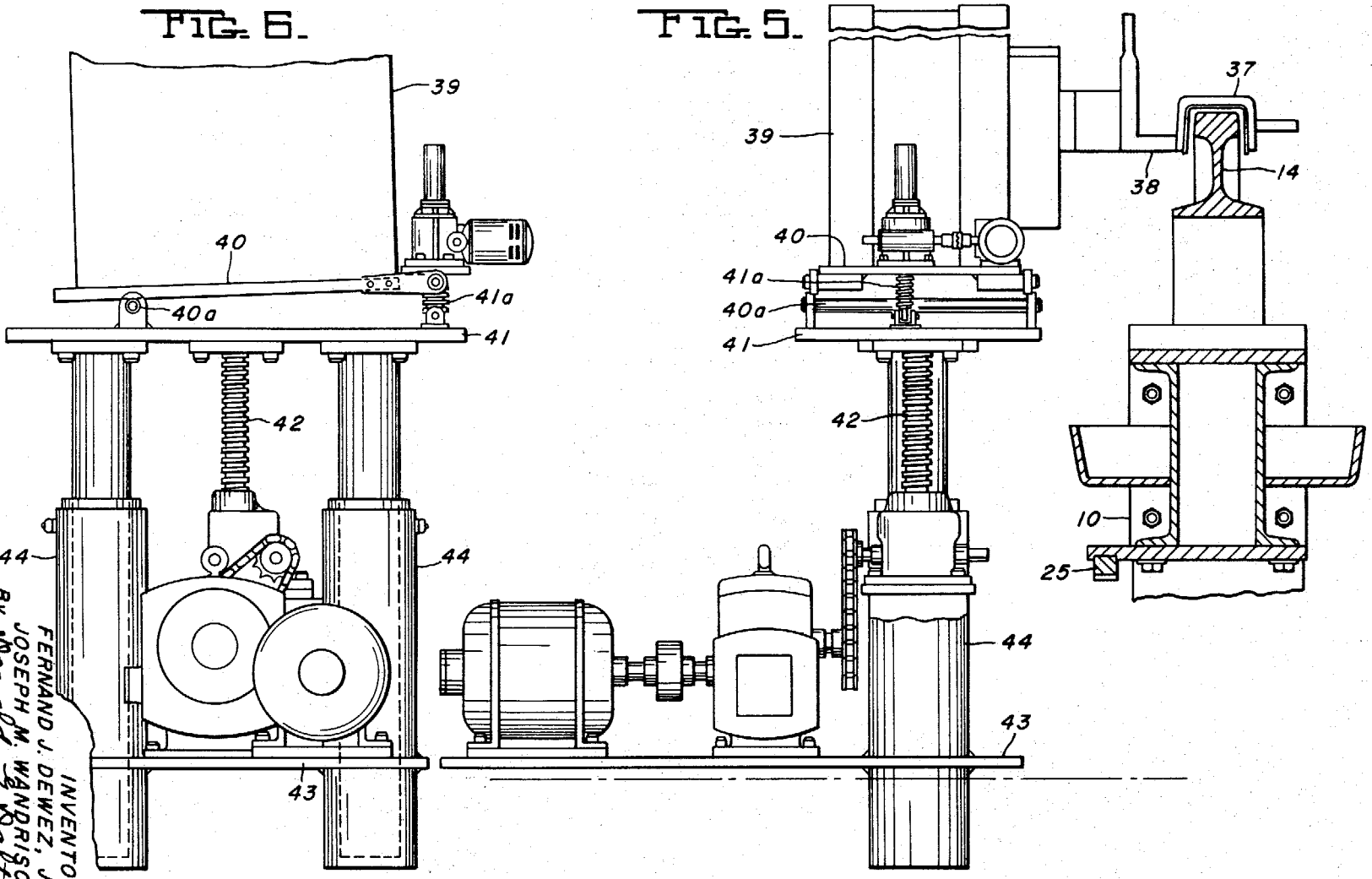
INVENTORS.
FERNAND J. DEWEZ, JR. and
JOSEPH M. WANDRISCO
By Donald G. Dalton
Attorney United States Patent Office Re. 27,221
Reissued Nov. 2, 1971

27,221
METHOD FOR HEAT TREATING RAILS

Fernand J. Dewez, Jr., Monroeville, and Joseph M. Wandrisco, Lower Burrell, Pa., assignors to United States Steel Corporation Original No. 3,124,492, dated Mar. 10, 1964, Ser. No. 230,119, Oct. 12, 1962. Application for reissue Aug. 6, 1969, Ser. No. 853,565
Int. Cl. C21d 1/06, 9/04
U.S. Cl. 148—131 5 Claims

Matter enclosed in heavy brackets [ ] appears in the original patent but forms no part of this reissue specification; matter printed in italics indicates the additions made by reissue.

*ABSTRACT OF THE DISCLOSURE*

*A method of heat treating a railroad rail so as not to distort its substantially straight condition whereby the rail is first elastically bent in the plane of the web and so maintained so that the head thereof is convex. The head portion is then heated progressively along its length sufficient to austenitize the head portion. This is followed by a progressive mild quench sufficient to transform the austenite to pearlite, and then self tempering by absorption of internal heat for a predetermined length of time. Thereafter the head is quenched to ambient temperatures whereupon the rail is released from its elastically bent position.*

This invention relates to a method for hardening the heads of steel railroad rails, thereby increasing their resistance to wear and plastic deformation under normally applied stress.

The apparatus disclosed herein is claimed in our divisional application, Serial No. 306,807, filed September 5, 1963.

The entire cross section or only the head section of rails may be heat-treated. Distortion of the rails resulting from the heat treatment usually necessitates subsequent mechanical straightening. Heat treatment of the head portion only causes the rail to distort so that the head has an upward concave curvature. The excessive mechanical straightening necessarily performed on such a rail may result in underside residual stresses which increase the danger of rapid fatigue faiure in service.

We have invented a method for progressively heat-treating the head portion only of rail section, from one end of the rail to the other, without leaving curvature in the treated rail such as to require excessive mechanical straightening. In a preferred practice of our method, we first bend within its elastic limit a rail at atmospheric temperature standing in normal position, longitudinally in a vertical plane so that the head portion has an upward convex curvature and the flange is concave downwardly. We then heat the head portion progressively along its length to a temperature such as to austenitize it. Thereafter we apply a mild quench to cause the transformation of the austenite on the surface to pearlite. Self tempering by absorption of internal heat is then permitted for a predetermined period after which the head portion is finally quenched substantially to atmospheric temperature. As a result, the fully treated rail is left substantially straight and requires little or no mechanical straightening. The apparatus we provide for carrying out the method outlined above is shown in detail in the accompanying drawings. In the drawings:

FIGURES 4 and 5 are cross sections taken along the planes of lines IV—IV and V—V of FIGURE 3, respectively, with parts in elevation;

FIGURE 6 is an elevation of the apparatus shown in FIGURE 5, looking from the left thereof.

Figure 1:
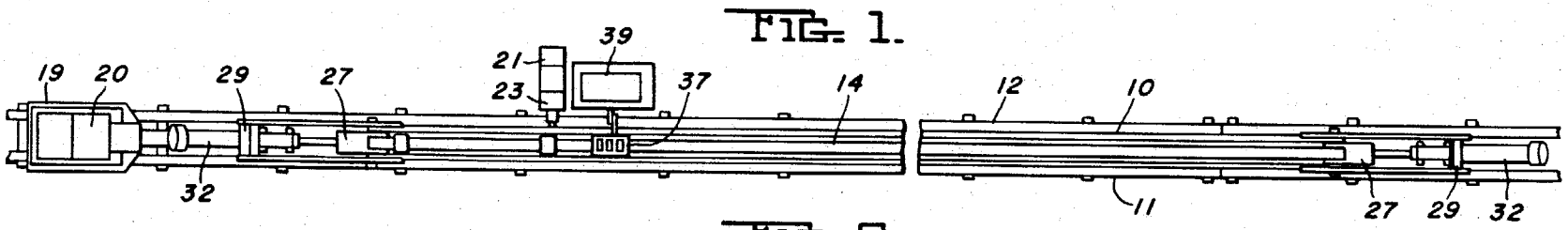
FIGURE 1 is a plan view on a small scale showing the general arrangement.
Figure 2:
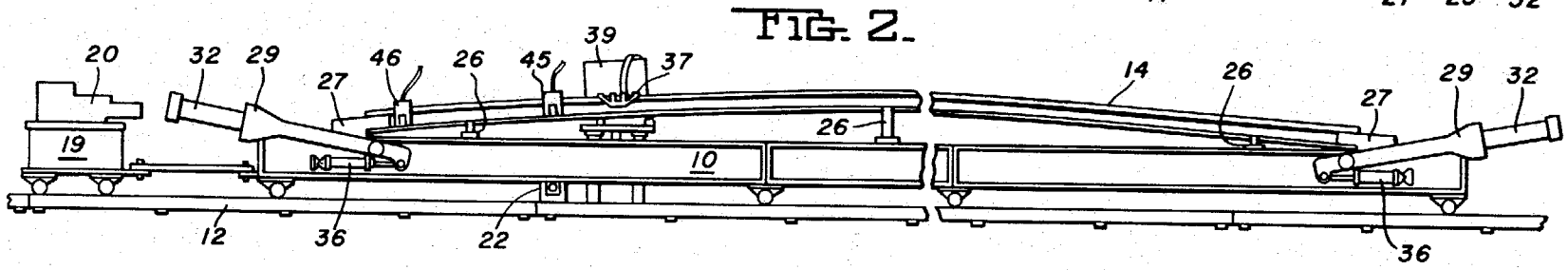
FIGURE 2 is an elevation thereof.
Figure 7:
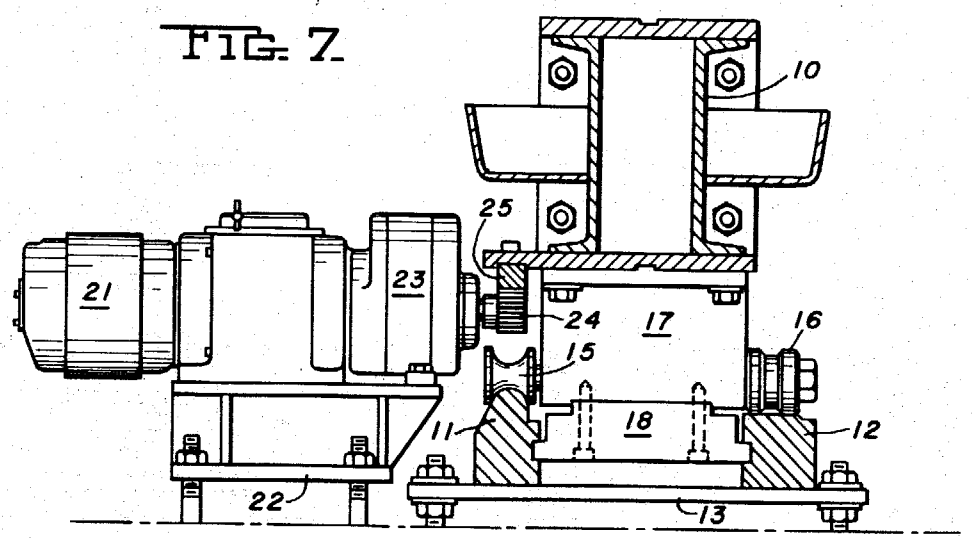
FIGURES 7 and 8 are views similar to FIGURES 4 and 5 taken, respectively, along the lines VII—VII and VIII—VIII of FIGURE 3.
Figure 3:
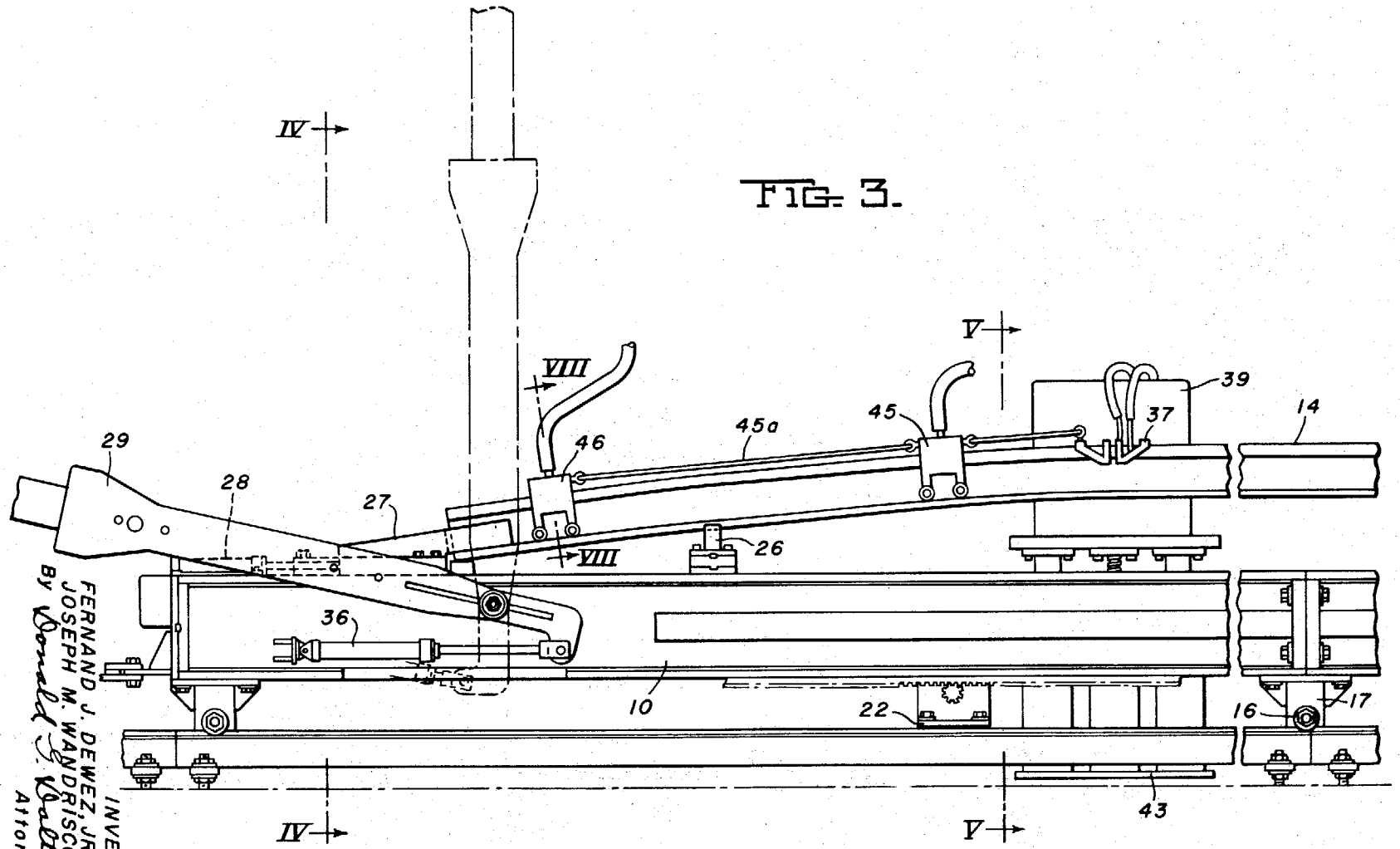
FIGURE 3 is a portion of FIGURE 1 to enlarged scale.

Referring now in detail to the drawings and, for the present, particularly to FIGURES 1–3 and 7, our apparatus comprises principally a rigid elongated box-section transport frame or carriage 10 adapted to travel along ways 11 and 12 secured to fixed cross beams 13. Carriage 10 is also adapted to support and hold a rail 14, having a head, web and flange bent longitudinally as shown, with the head portion convex upwardly and the flange concave downwardly, in a vertical plane, during progressive heat treatment as will be described in greater detail later. For travel along ways 11 and 12, carriage 10 is fitted at intervals with wheels 15 and 16 (FIGURE 7) journaled on shafts fixed in trucks 17. A hold-down plate 18 is secured to each truck and has its ends dove-tailed into longitudinal grooves on the inner faces of the ways. A car 19 similarly constructed is coupled to one end of carriage 10 for travel along the ways and carries a motor-driven pump 20 for supplying liquid under pressure to hydraulic auxiliaries to be described shortly. Carriage 10 is driven by a motor 21 mounted on a base 22. The motor drives a reduction gear 23 and a pinion 24 which meshes with a rack bar 25. The bar is mounted on the bottom of the frame 10 at one side thereof.

Figure 4:
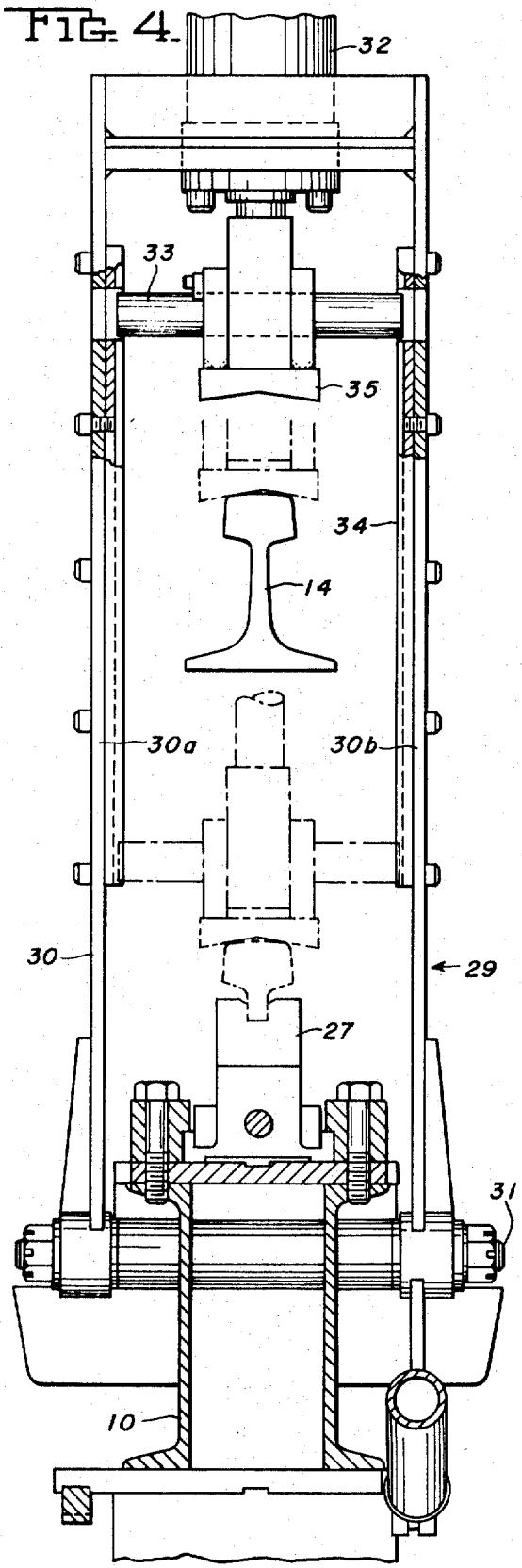

Rail-supporting blocks or abutments 26 of varying heights are mounted on carriage 10 and spaced therealong. A hold-down jaw 27 is gibbed to each end of the frame so as to be slidable into and out of engagement with an end of rail 14. A hydraulic power unit 28 including a cylinder and piston is provided for actuating each jaw 27. Each end of the frame also has a rail bending jack 29 pivoted thereon for movements into and out of operating position. The jack structure is more clearly shown in FIGURES 3 and 4.

Each jack 29 comprises a rectangular frame 30 pivoted to carriage 10 on a through shaft 31. The frame is surmounted by a fluid-pressure cylinder and piston 32. The piston rod thereof actuates a cross-head 33 reciprocable in slotted guides 34 carried by spaced side rails 30a and 30b of the frame. The cross-head has a pad 35 thereon adapted to engage the end of a rail placed on blocks 26 and bend it to a curved condition as shown in FIGURE 1, within the elastic limit. Each jack 29 has a fluid-pressure cylinder and piston 36 pivoted thereto and to carriage 10, whereby it may be raised to vertical operative position or tilted down to an out-of-the-way position as shown in FIGURE 1.

For effecting the desired heat treatment of a rail which has been prebent as explained above, we provide an inductor 37 adapted to travel along the head of the rail as the latter is carried by carriage 10 along ways 11 and 12. As shown in FIGURE 5, the inductor is mounted on an arm 38 extending laterally over carriage 10 from a transformer 39. The inductor and its current supply are of the well known high-frequency electromagnetic induction type of industrial heating equipment commercially available. The transformer is mounted on a tilting table 40 pivoted at 40a to a sub-platform 41. A motor-driven screw jack 41a on the platform operates to tilt table 40 as necessary to keep the inductor in close proximity to the head of the rail as it travels thereunder. Platform 41 may be raised and lowered by a motor-driven screw jack 42 standing on a base plate 43. Piston-cylinder guides 44 also standing on plate 43 are actuated to hold platform 41 horizontal as it is raised or lowered.

Figure 8:
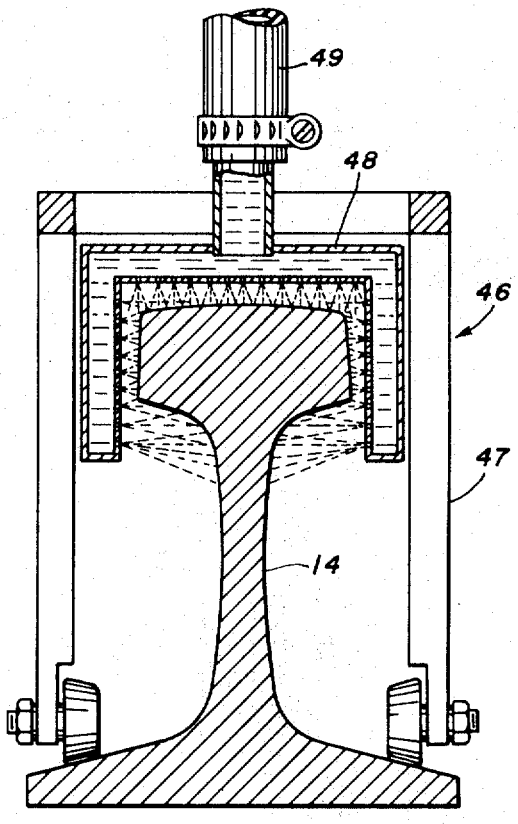

An initial quenching head 45 is adapted to ride along the rail flange a predetermined distance behind inductor 37 and a final quenching head 46 (see FIGURE 8) a predetermined distance behind head 45. Heads 45 and 46 are generally similar each comprising a wheeled frame 47 mounting a nozzle manifold 48 to which a flexible hose 49 supplies quenching fluid. In the case of head 45, the fluid is air to effect a mild quench. In the case of head 46 the fluid is water. Both heads are manually portable and are applied to the rail head by hand as the inductor 37 reaches its proper position in advance along the length of the rail. Head 45 is connected to inductor 37 and head 46 to head 45 by spacer rods 45a (see FIGURE 3) to keep them in properly spaced relation.

While the method of our invention will probably be clear from the foregoing, it will be briefly summarized at this point. With the carriage 10 at its extreme right-hand position along ways 11, 12 as viewed in FIGURE 1, jaws 27 retracted and jacks 29 in the downtilted position there shown, a rail 14 is placed on blocks 26 and the jacks erected by operation of cylinders 36. The jacks are then operated to bend the rail to the position shown, within the elastic limit, as previously explained, and jaws 27 are advanced to hold the rail in its bent condition. Jacks 29 are then retracted and tilted down.

Movement of carriage 10 along the ways is then initiated by operating motor 21 and inductor 37 is positioned close to the rail head by adjustment of platform 41 and table 40 as necessary. The inductor quickly heats the rail head from atmospheric temperature to austenitization temperature (about 2000° F. on the surface) to a depth of as much as 1½" but preferably from ¼ to 1". When the inductor has attained its proper lead as a result of continued travel of frame 10, quenching head 45 is manually placed on the rail and rides therealong as the rail continues to move. The air jets discharged by head 45 effect a mild quench which transforms the austenitized portion of the rail head to pearlite.

Following the initial air quench, self tempering of the surface of the rail head is permitted by outward flow of heat from the interior thereof, causing the surface temperature to rise again to about 1250° F. After further travel of the rail to afford suitable spacing behind head 45, final quenching head 46 is similarly applied to the rail head. The water jets therefrom cool the rail to atmospheric temperature, abstracting substantially all sensible heat.

After the trailing (right-hand) end of the rail has passed the inductor 37, the quenching heads 45 and 46 are taken off in their turn and disposed ready to hand for the next rail. Jacks 29 are again erected and their piston rods extended to hold the rail ends down for withdrawal of jaws 27, thereafter, the piston rods of cylinders 32 are backed off to ease the rail into normal condition. The rail may then be removed for further processing and carriage 10 returned to starting position.

As a specific example of the practice of our invention, standard 39' railroad rails (Section 13225) were treated in the following manner. Each rail was prebent to a curvature producing a rise of about 10½" at the midordinate, by the use of apparatus shown in the drawings. Two 3" high supports 26 were located 39" from each end of the rail and two 10" high supports were located at point 4' from the center of the rail length. The inductor 37 was energized with 960-cycle current with a power input of 230 kw. The rail 14 was passed beneath the inductor at a speed of 12½" per minute and the rail head was heated thereby above the transformation temperature to a depth of about 1". The maximum surface temperature attained was about 2000° F. The rail-head surface cooled in the ambient air to about 1350° F. prior to reaching the air-quench head 45 which was spaced 1¼' from the trailing end of the inductor. The high-pressure air from the head 45, by an initial mild quench, transformed the austenitized portion of the rail head to a microstructure of pearlite.

After the air quench, sufficient residual heat remained within the rail head to reheat the quenched surface thereof to a temperature of about 1250° F. for tempering. The final water-quench head 46, which was positioned 4' from the trailing end of the air-quench head 45 delivered water sprays to the rail head at a rate of 3 gallons per minute. This quickly cooled the rail head from the tempering temperature to ambient temperature. When a treated rail was released from the clamps, it exhibited only a ½" curvature along the entire length. In addition, the head hardness ranged from 320 to 350 Brinell to a depth of ¾" along the length of the rail. The tensile properties at the hardened portion are presented in Table I.

TABLE I

Typical Tensile Properties of Specimens From Near the Gage Corner of the Heads of Section 13225 Railroad Rails

| Treatment | Yield strength (0.2% offset), p.s.i. | Tensile strength, p.s.i. | Elongation in 1 inch, percent | Reduction of area, percent |
|---|---|---|---|---|
| Induction-heat treated | 120,400 | 177,900 | 13.0 | 37.0 |
| Untreated controlled-cooled | 72,500 | 135,800 | 12.5 | 24.5 |

The rail also developed desirable residual compressive stresses adjacent to the head surface and at the edges of the flanges. The magnitudes of these stresses (about 35,000 p.s.i. at the head and 15,000 p.s.i. at the edges of the flanges) are such that the rails will resist failure at these locations resulting from the dynamic tensile stresses developed in service. These compressive stresses were balanced by internal residual tensile stresses up to about 25,000 p.s.i., which because of their location do not prove harmful to service performance.

Although we have described one specific example of the practice of our invention, all standard railroad rails and crane rails, with weights in the range of 85 lb. per yd. to 175 lb. per yd., may be heat-treated to depths greater than 3/16" by our method at speeds ranging from 6" to 36" per minute. The extent of prebending required is inversely proportional to the section modulus of the rail and the rate of heat treatment. It may vary in the range from a rise of 6" at the midordinate for the heavier sections to 18" at the midordinate for the lighter sections. At increased rates of heat treatment, the extent of prebending will be increased accordingly. The rails may be tempered within the range from 800° F. to temperatures less than the lower critical temperature of the steel. The time at temperature varies inversely with the tempering temperatures up to 12 minutes at lower tempering temperatures. Also the length of rail being subjected at any one time to austenitizing, quenching, and tempering may vary within the range of 2 to 9' depending upon the cross-sectional area of the rail and the rate of heating.

In the practice of our invention, it is critical that an essentially pearlite microstructure be formed in the rail head. This microstructure forms at relatively high transformation temperatures; it is more ductile and, therefore, exhibits greater crack resistance than microstructures formed at lower transformation temperatures. In addition, since the desired pearlitic microstructure forms at high temperature, the necessary quench permits sufficient heat to remain in the rail head for adequate self tempering. Microstructures formed at lower transformation temperatures with a more severe quench require the application of external heat for tempering. A pearlitic microstructure is also desirable because the stresses resulting from the volumetric change during transformation from austenite aid in producing the desirable residual compressive stresses in the rail head. Furthermore, large volumetric changes, which might change the desirable stress pattern, do not occur during subsequent tempering.

Microstructures, such as martensite, undergo a large volumetric change during tempering that result in undesirable residual tensile stresses in the rail head. Therefore, the microstructure obtained in the practice of the present invention must be essentially pearlite. It is to be understood, however, that amounts of proeutectoid ferrite up to 10% and bainite up to 25% may be present without harming the desired residual-stress pattern or the ductility.

The final water quench does not affect the mechanical properties of the rail but, when used in combination with the prebending step, produces a rail that is substantially straight. In the absence of the final water quench, the temperature variations along the length of the rail create corresponding variations in the thermal expansion of the rail. Consequently, the radius of rail curvature varies along the heated part of the rail during heat treatment. By using a final water quench, the length of the heated portion of the rail is relatively short at all stages of the treatment; hence, the radius of curvature and the prestress in the portion of the rail length being austenitized, quenched and tempered are maintained uniform during the heat-treating operation.

Although we have disclosed herein the preferred practice of our invention, we intend to cover as well any change or modification therein which may be made without departing from the spirit and scope of the invention.

We claim:

1. A method of heat treating a railroad rail having a head, web and flange which comprises bending the rail in the plane of the web thereof, within the elastic limit, so that the head is convex and the flange concave, continuously heating the head of the *bent* rail progressively, from one end thereof to the other, above the austenitization temperature while holding the rail in its curved condition, initially *air* quenching the surface of the head progressively a predetermined time after the heating *to cause the transformation of austenite to pearlite without formation of any martensite,* then, at a predetermined time after self tempering of the quenched surface has occurred by absorption of heat from the interior of the head, finally quenching the head throughout substantially to ambient temperature and then releasing the rail from bending stress thereby permitting it to resume its normal substantially straight condition.

[2. A method as defined in claim 1, characterized by effecting said initial quenching by air jets.]

3. A method as defined in claim 1, characterized by effecting said final quenching by liquid jets.

4. A method as defined in claim 1, characterized by effecting said heating by electromagnetic induction.

*5. A method of heat treating a railroad rail having a head, web and flange which comprises bending the rail in the plane of the web thereof, within the elastic limit, so that the head is convex and the flange concave, continuously heating the head of the rail progressively, from one end thereof to the other, above the austenitization temperature while holding the rail in its curved condition, then, a predetermined time after the heating, subjecting the surface of the head progressively to an air quench to transform the austenitized portion of the rail head to essentially pearlite without formation of any martensite, then self tempering the quenched surface by absorption of heat from the interior of the head, then quenching the head throughout substantially to ambient temperature, and then releasing the rail from bending stress thereby permitting it to resume its normal substantially straight condition.*

*6. A method as defined in claim 5, characterized by the transformed portion of the rail head including up to 10% proeutectoid ferrite and up to 25% bainite.*

References Cited

The following references, cited by the Examiner, are of record in the patented file of this patent or the original patent.

UNITED STATES PATENTS

| | | | |
|---|---|---|---|
| 1,516,407 | 11/1924 | Sandberg. | |
| 1,929,356 | 10/1933 | Janitzky. | |
| 1,967,317 | 7/1934 | Mogfond et al. | |
| 2,049,830 | 8/1936 | Bayless. | |
| 2,088,282 | 7/1937 | Van Royen | 148—12 |
| 2,254,307 | 9/1941 | Mott et al. | 148—151 |
| 2,542,940 | 2/1951 | Pioch et al. | |
| 2,570,883 | 10/1951 | Stivin. | |
| 2,792,212 | 5/1957 | Kirby et al. | |

FOREIGN PATENTS

| | | |
|---|---|---|
| 587,785 | 8/1927 | Germany. |
| 1,931 | 4/1951 | Japan. |

CHARLES N. LOVELL, Primary Examiner

U.S. Cl. X.R.

148—146